(12) United States Patent
Wickman et al.

(10) Patent No.: US 6,952,297 B2
(45) Date of Patent: Oct. 4, 2005

(54) METHOD OF DIFFERENTIALLY CONNECTING PHOTONIC DEVICES

(75) Inventors: Randy Wickman, Cadott, WI (US); Dan Mansur, Chippewa Falls, WI (US)

(73) Assignee: Emcore Corporation, Somerset, NJ (US)

(*) Notice: Subject to any disclaimer, the term of this patent is extended or adjusted under 35 U.S.C. 154(b) by 726 days.

(21) Appl. No.: 09/957,257

(22) Filed: Sep. 20, 2001

(65) Prior Publication Data

US 2002/0033985 A1 Mar. 21, 2002

Related U.S. Application Data

(60) Provisional application No. 60/234,402, filed on Sep. 21, 2000.

(51) Int. Cl.[7] .............................. G02F 1/07; G09G 3/36; H03K 17/72; H02H 7/125; H04B 10/04
(52) U.S. Cl. ..................... 359/245; 359/248; 345/87; 345/89; 327/438; 327/514; 327/360; 363/54; 398/182; 398/140; 708/844
(58) Field of Search .................... 359/245, 248; 345/87, 89, 95, 211; 363/54; 327/360, 438, 514; 398/140, 182; 708/844

(56) References Cited

U.S. PATENT DOCUMENTS

| | | | | | |
|---|---|---|---|---|---|
| 3,407,301 | A | * | 10/1968 | Kovanic | 398/140 |
| 3,624,378 | A | * | 11/1971 | Brunkhorst | 708/844 |
| 4,029,976 | A | * | 6/1977 | Fish et al. | 327/514 |
| 4,633,380 | A | * | 12/1986 | Kashiwazaki | 363/54 |
| 6,380,917 | B2 | * | 4/2002 | Matsueda et al. | 345/89 |
| 6,674,420 | B2 | * | 1/2004 | Matsueda et al. | 345/87 |

* cited by examiner

Primary Examiner—Loha Ben
(74) Attorney, Agent, or Firm—Welsh & Katz, Ltd.

(57) ABSTRACT

A method and apparatus are provided for driving an electro-optic converter assembly with an information signal. The method includes the steps of disposing a resistor having a resistance substantially equal to a resistance of the electro-optic converter adjacent the electro-optic converter, coupling the electro-optic converter and resistor together, in series, to form a current loop, driving the electro-optical converter end of the current loop with the information signal and driving the resistor end of the current loop with an opposite polarity of the information signal.

35 Claims, 4 Drawing Sheets

METHOD OF DIFFERENTIALLY CONNECTING PHOTONIC DEVICES

This application claims the benefits of Provisional Application Ser. No. 60/234,402 filed Sep. 21, 2000.

FIELD OF THE INVENTION

The field of the invention relates to communication systems and more particularly to optical transmission systems.

BACKGROUND OF THE INVENTION

The use of optical signals in communication systems is generally known. One example of the use of optical signals is the fiber optic trunk lines used by the telephone company. Such systems typically transfer optical signals over many kilometers from an optical transmitter in a first central switching office to an optical receiver in a second central switching office.

Further, a number of optical protocols have been developed (e.g., SONET) for use within optical transmission systems (e.g., OC24, OC48, etc.). Such protocols support the use of a number of logical control and subscriber channels all transparently operating within a single optical signal. Other technologies (e.g., WDM) have also been developed that allow the simultaneous use with a number of optical signals (carriers) within a single optical fiber.

While such technologies are effective, they are still dependent upon the effectiveness of the modulation and demodulation processes. Where the modulation and demodulation processes allow for the introduction of noise, a practical limit exists in the ability to improve the speed of such processes. Accordingly, a need exists for means for eliminating or reducing the introduction of noise during the modulation and demodulation processes.

SUMMARY

A method and apparatus are provided for driving an electro-optic converter assembly with an information signal. The method includes the steps of disposing a resistor having a resistance substantially equal to a resistance of the electro-optic converter adjacent the electro-optic converter, coupling the electro-optic converter and resistor together, in series, to form a current loop, driving the electro-optical converter end of the current loop with the information signal and driving the resistor end of the current loop with an opposite polarity of the information signal.

The method substantially reduces the noise commonly caused by un-balanced currents flowing between driver circuits and photonic devices. These unbalanced currents, in combination with the impedance of electrical connections, tend to distort transmitted signals, slow down signal transitions and cause cross-talk among transmitted signals.

DETAIL DESCRIPTION OF AN ILLUSTRATED EMBODIMENT

Figure 1:
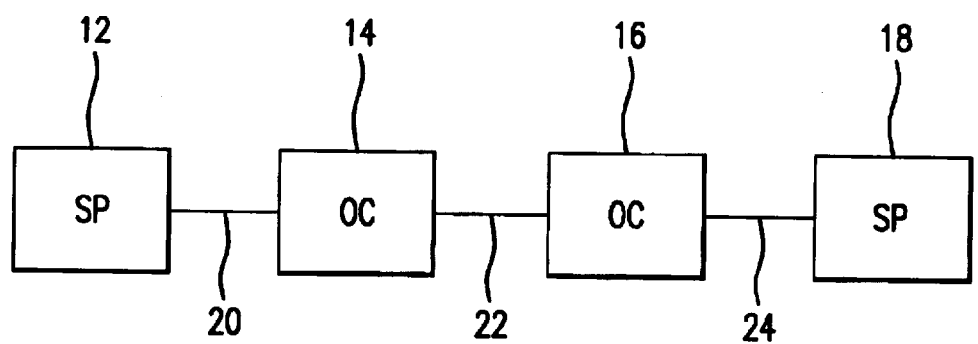
FIG. 1 is a block diagram of an optical communication system in accordance with an illustrated embodiment of the invention.

FIG. 1 depicts an optical communication system 10, generally in accordance with an illustrated embodiment of the invention. Under the illustrated embodiment, a signal processor (e.g., a multiplexer, signal router, computer, etc.) 12 may modulate an electric signal with an information signal from external sources (not shown). The modulated electrical signal may be transferred through an electrical conductor 20 to an optical converter 14.

Within the optical converter 14, the modulated electrical signal may be amplified in an amplifier and provided as in input to an optical device (e.g., gas laser, diode laser, etc.). Within the optical device the modulated electrical signal may be used to modulate a coherent optical signal (laser beam). The modulated laser beam may be transferred through a waveguide (e.g., an optical fiber) 22, or through free-space, to a second optical converter 16.

Within the second optical converter 16, an optical detector (e.g., an PIN diode) may detect the modulated laser signal and convert it back into the electrical domain. The converted electrical signal may be amplified in an amplifier and transferred to a second signal processor 18 through a second electrical conductor 24. The second signal processor 18 may process the modulated electrical signal for the benefit of other external devices (not shown).

The communication system 10 may be used wherever high speed communications are required. For example, the system 10 may be used in conjunction with carrier-class routers, which direct Internet protocol traffic; Dense Wavelength Division Multiplexing (DWDM) transmission equipment which transmit telephony and data-traffic, etc. Alternatively, or in addition, the system 10 may be used in conjunction with any of a number of special processing requirements (e.g., IP encoded Internet traffic, SONET telephony signals, ATM data signals, Virtual Private Networks (VPNs), etc.).

The electro-optical converter 14 of FIG. 1 may be structured to offer superior speed and performance. The electro-optical converter 14 may include an electro-optical converting device (e.g., photonics emitter) 34 (FIG. 2) using a differential driving circuit 36 for purposes of increasing an optical rate. The differential circuit may be used with virtually any optical emitter (e.g., light emitting diode (LED), vertical cavity surface emitting laser (VCSEL), laser diode, metal-semiconductor-metal (MSM) devices, etc.) and has been found to significantly increase modulation speed. Differential signaling has been found to reduce common-mode noise, electromagnetic far-field emission and simultaneous switching noise associated with single ended switching.

Figure 2:
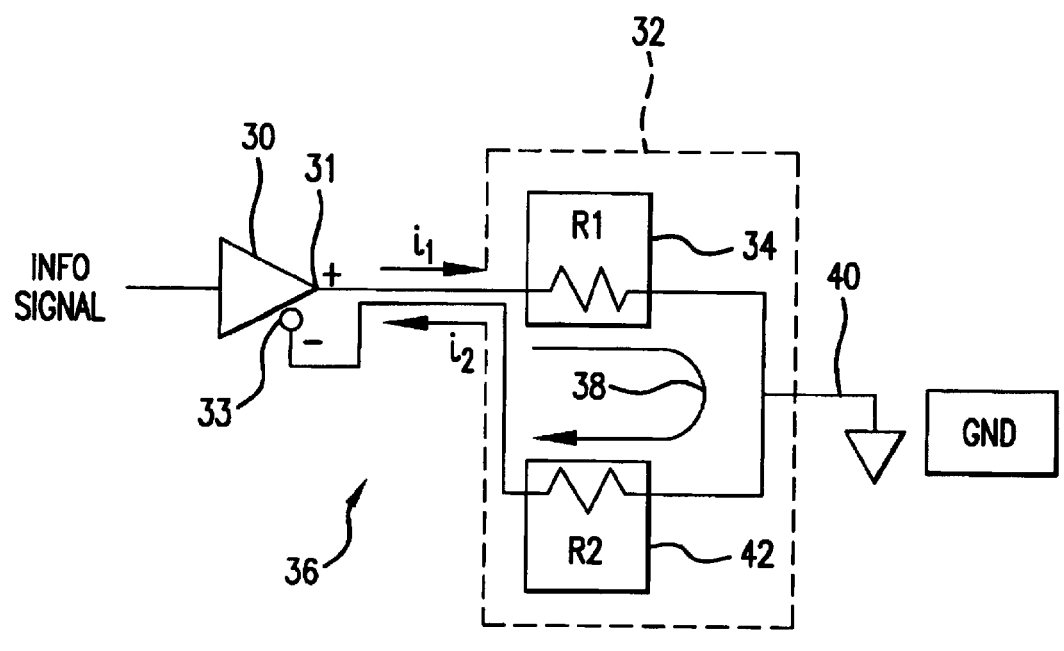
FIG. 2 is a schematic of an electro-optic converter of the system of FIG. 1.

FIG. 2 depicts a differential signaling schematic that may be used in conjunction with the photonics converter 14 of FIG. 1. More specifically, FIG. 2 shows a means of differentially driving (i.e., a driver circuit 36 for driving) a photoemitter 34.

As shown in FIG. 2, an information signal is provided as an input to an amplifier 30. The amplifier 30 provides a positive output and an inverted output. The positive and inverted outputs are herein referred to as a differential outputs.

The positive output is applied as an input to the photoemitter 34. The inverted output is provided as an input to a resistor 42 having a resistance value R2.

In the diagram of FIG. 2, a resistance of the driver circuit 36 may be substantially equal to the combined resistance values of R1 and R2. R1 may represent a resistance of the photoemitter 34. As may be noted, a ground potential exists between R1 and R2.

In effect, a first difference signal (i.e., the "true signal") may be applied to the photoemitter 34 from a positive terminal 31 of the amplifying device (i.e., differential amplifier) 30. A second opposite polarity difference signal (i.e., the "compliment signal") may be applied to the resistor 42 from a negative terminal 33 of the amplifying device 30.

In general, differential signals (true and compliment) may be terminated to like impedance loads (R1=R2) to provide a current and voltage balance. In general, the series-connected optical converter 34 and resistor 42 form a current loop 38 in which the entering current $i_1$ equals the exiting current $i_2$. While a ground connection 40 may exist between the photoemitter 34 and resistor 42, no current will typically flow through the ground connection 40 because the true and compliment signals substantially equal each other and have an opposite polarity.

In effect, the impedances of the two sides of the loop circuit are balanced, resulting in balanced current ($i_1=i_2$). By placing the paths carrying the currents $i_1,i_2$ to the loop 38 in close proximity, the self-inductance of the individual conductors supplying the loop circuit is substantially cancelled.

If the loads were to be different (i.e., R1≠R2), then there will be a current and voltage imbalance between the two paths, resulting in decreased electrical performance. By allowing one line of the closely spaced signal pair to function as the current return path (i.e., $i_1=i_2$), the signal lines also have the advantage of controlled impedance and reduced loop inductance. Further, the close spacing mitigates noise pickup because both lines are equally affected. Since both lines are equally affected, the result is substantially complete cancellation of electromagnetic interference (EMI) originating from the surrounding environment.

The electro-optic converter 34 and resistor 42 may be fabricated on a common substrate 32. The electro-optic converter 34 can have, but is not limited to, a positive-intrinsic-negative (pin) semiconductor structure, where the active optical region is intrinsic (i) and ohmic electrical contacts may be formed on adjacent p and n layers. Other semiconducting structures may include pn, np, or multiple alternating pn, pin, np structures. Semi-insulating substrates 32 may also be used.

Figure 3:
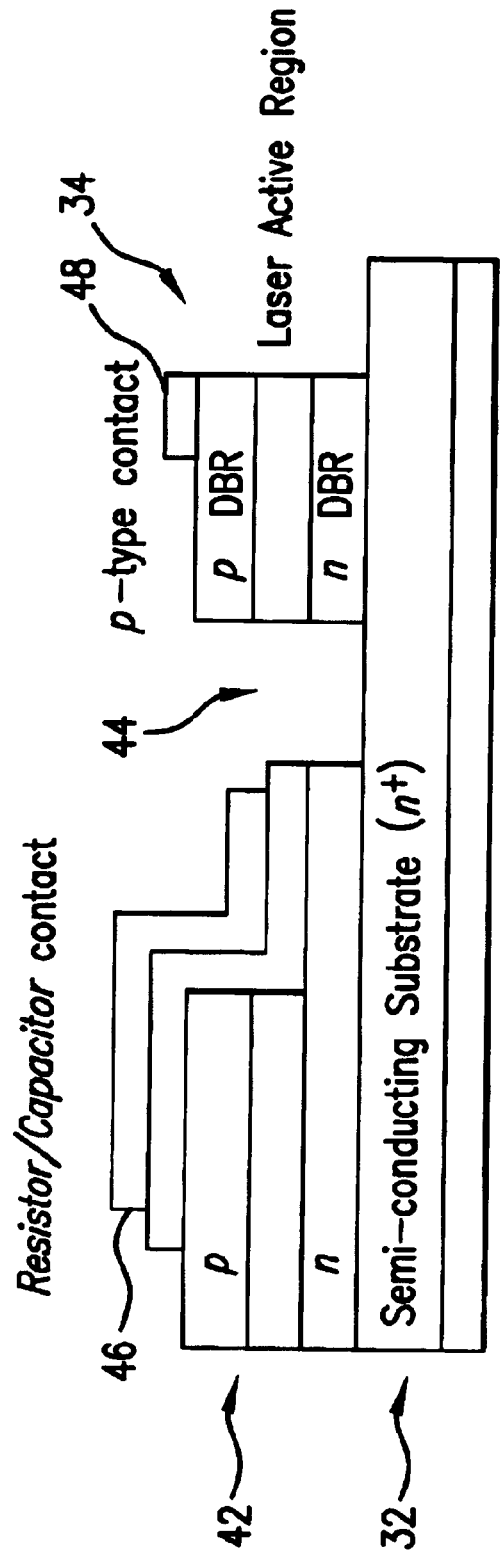
FIG. 3 depicts the photoemitter and resistor of FIG. 2 at the chip level.

Epitaxy pin layers may be formed on the substrate using any appropriate process and may make up the optically active device (i.e., the photoemitter) 34 as shown in FIG. 3. The photoemitter 34 and resistor 42 may, in fact, be fabricated as identical structures. Lateral confinement (i.e., isolation) among components 34, 42 can be accomplished by any means, including etching, ion implantation, and native oxide confinement; although, confinement is not exclusive to these means. Confinement can be extended to both electrical and optical domains in the case of adjacent devices where the converter 14 is part of an array. Series resistance (R1) may be determined by the semiconductor doping levels and thickness of the p, n and intrinsic layers.

Electrical parasitics associated with connections to the devices 34, 42 are reduced by structuring both signal lines as a differential pair to the photonic device 34 and by making both n-contact and p-contact on the same side of the device. This contact configuration simplifies packaging by providing contact surfaces amenable to mass production techniques.

By removing material on either side of the semiconductor wafer, a well 44 may be creating allowing electrical access to both the p-layer and n-layer from the same side of the wafer. In the example of FIG. 3 the p-type material was removed in a defined area near the photonic device 34. Once the p-type material was removed, the series resistance of the resistor 42 can be controlled by selectively etching the remaining epi-layer thickness and area.

In determining the resistance R, the value of the resistance for a semiconductor may be determined through use of the equation R=ρL/A, where ρ is resistance per micrometer (μm), L is the thickness of the material and A is the area of the material. For p-type GaAs doped with Be to a level of $3e^{18}/cm^2$, the value of ρ may be 100 ohms/μm. For n-type GaAs doped with Si to a level of $3e^{18}/cm^2$, the value of ρ may be 10 ohms/μm. For the active region in the GaAs, the value of ρ may be 2000 ohms/μm.

For the devices 34, 42 the thickness of the p-type material $L_p$ may be 5 μm (if unetched). The thickness of the intrinsic material $L_i$ may be 1 μm and the thickness of the n-type material $L_n$ may be 4 to 5 μm.

If the p-type material is removed by etching, then the resistance of the p layer $R_p$ may be equal to zero. Using the above equation, the resistance of the active layer $R_i$ may be 20 ohms and the n layer $R_n$ may be 0.5 ohms. The resistance of the ohmic contact $R_{metaltrace}$ may be 5 ohms. The total $R_T$ for the resistor 42 may be 25 ohms.

By adjusting the thickness and size of the p, active, and n layers, among the devices 34, 42, the resistances of the photoemitter 34 and 42 may be made substantially equal. Further, by adjusting the overall resistance of the loop 38 to equal 50 ohms, the impedance of the loop 38 may be matched to a 50 ohm transmission line that may exist between the amplifier 30 and loop 38.

Once the series resistance has been balanced (R1=R2), contacts 46, 48 may be added. The external ohmic contacts 46, 48 may be created using any appropriate photolithographic and semiconductor process.

Once the contacts 46, 48 have been created, a set of final connections with the amplifier 30 may be created. Where the amplifier 30 is also formed on the substrate 32, the final set of connections may be made using an appropriate lithographic process. Where the amplifier is located elsewhere, wire-bonding may be used.

As discussed above, with reference to FIG. 2, the total resistance of the driver circuit 26 may be substantially equal to the combined resistance of R1 and R2. A ground potential may exist between R1 and R2.

Figure 4:
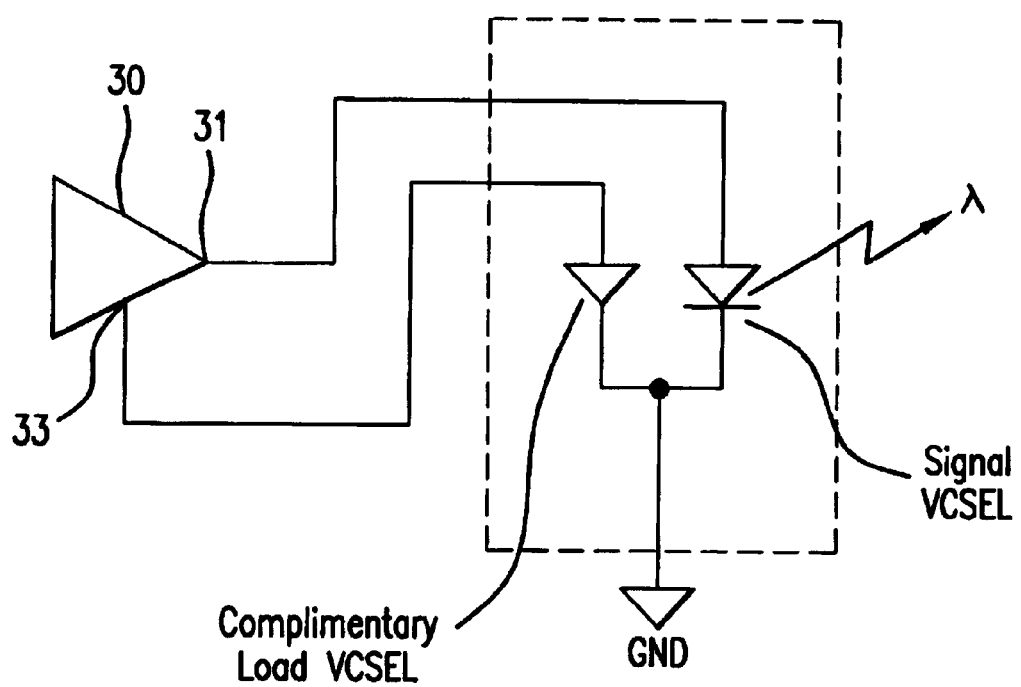
FIG. 4 depicts the schematic of FIG. 2 under an alternate embodiment.

In an alternate illustrated embodiment (FIG. 4), the resistor R2 may be replaced by another VCSEL (i.e., a complimentary load VCSEL). As above, the resistance of the complementary load VCSEL is substantially equal to the signal VCSEL.

A specific embodiment of a method and apparatus for improving optical communication has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of driving an electro-optic converter assembly with an information signal, such method comprising the steps of:

disposing a resistor having a resistance substantially equal to a resistance of the electro-optic converter adjacent the electro-optic converter;

coupling the electro-optic converter and resistor together, in series, to form a current loop;

driving the electro-optic converter end of the current loop with the information signal; and driving the resistor end of the current loop with an opposite polarity of the information signal.

2. The method of driving an electro-optic converter assembly as in claim 1 wherein the step of disposing the resistor adjacent the electro-optic converter further comprises fabricating the electro-optic converter and resistor on a common substrate.

3. The method of driving an electro-optic converter assembly as in claim 2 further comprising fabricating the resistor and electro-optic converter on the common substrate as substantially identical structures.

4. The method of driving an electro-optic converter assembly as in claim 3 wherein the step of coupling the electro-optic converter and resistor together to form a current loop further comprises coupling a substrate end of the electro-optic converter and resistor to the substrate.

5. The method of driving an electro-optic converter assembly as in claim 4 further comprising coupling the substrate end to a ground potential.

6. The method of driving an electro-optic converter assembly as in claim 2 further comprising etching a well between the electro-optical converter and resistor.

7. The method of driving an electro-optic converter assembly as in claim 1 further comprising disposing a conductive trace across a top layer of the resistor interconnecting the top layer and an intrinsic layer of the resistor.

8. The method of driving an electro-optic converter assembly as in claim 1 further comprising forming connections with the electro-optic converter and resistor on a common side of the substrate.

9. The method of driving an electro-optic converter assembly as in claim 8 wherein the step of coupling the electro-optic converter and resistor to a differential amplifier further comprises coupling the electro-optic converter to a positive output of the differential amplifier and the resistor to a negative polarity output of the differential amplifier.

10. The method of driving an electro-optic converter assembly as in claim 1 further comprising coupling the electro-optic converter and resistor to a differential amplifier.

11. An apparatus for driving an electro-optic converter assembly with an information signal, such apparatus comprising:

a resistor having a resistance substantially equal to a resistance of the electro-optic converter disposed adjacent the electro-optic converter;

means for coupling the electro-optic converter and resistor together, in series, to form a current loop;

means for driving the electro-optical converter end of the current loop with the information signal; and means for driving the resistor end of the current loop with an opposite polarity of the information signal.

12. The apparatus for driving an electro-optic converter assembly as in claim 11 further comprising the electro-optic converter and resistor disposed on a common substrate.

13. The apparatus for driving an electro-optic converter assembly as in claim 12 further comprising the resistor and electro-optic converter fabricated on the common substrate as substantially identical structures.

14. The apparatus for driving an electro-optic converter assembly as in claim 13 wherein the means for coupling the electro-optic converter and resistor together to form a current loop further comprises means for coupling a substrate end of the electro-optic converter and resistor to the substrate.

15. The apparatus for driving an electro-optic converter assembly as in claim 14 further comprising means for coupling the substrate and to a ground potential.

16. The apparatus for driving an electro-optic converter assembly as in claim 12 further comprising a well etched between the electro-optic component and resistor.

17. The apparatus for driving an electro-optic converter assembly as in claim 11 further comprising a conductive trace disposed across a top layer of the resistor interconnecting the top layer and an intrinsic layer of the resistor.

18. The apparatus for driving an electro-optic converter assembly as in claim 11 further comprising means for forming connections with the electro-optic converter and resistor on a common side of the substrate.

19. The apparatus for driving an electro-optic converter assembly as in claim 18 wherein the means for coupling the electro-optic converter and resistor to a differential amplifier further comprises means for coupling the electro-optic converter to a positive output of the differential amplifier and the resistor to a negative polarity output of the differential amplifier.

20. The apparatus for driving an electro-optic converter assembly as in claim 11 further comprising means for coupling the electro-optic converter and resistor to a differential amplifier.

21. An apparatus for driving an electro-optic converter assembly with an information signal, such apparatus comprising:

the electro-optic converter;

a resistor having a resistance substantially equal to a resistance of the electro-optic converter disposed adjacent the electro-optic converter and operably coupled in series with the electro-optic converter to form a current loop; and an amplifier adapted to drive the electro-optic converter end of the current loop with the information signal and the resistor end of the current loop with an opposite polarity of the information signal.

22. The apparatus for driving an electro-optic converter assembly as in claim 21 further comprising the electro-optic converter and resistor disposed on a common substrate.

23. The apparatus for driving an electro-optic converter assembly as in claim 22 further comprising the resistor and electro-optic converter fabricated on the common substrate as substantially identical structures.

24. The apparatus for driving an electro-optic converter assembly as in claim 23 wherein the current loop further comprises a connection between the electro-optic converter and resistor and the substrate.

25. The apparatus for driving an electro-optic converter assembly as in claim 24 further comprising a connection between the substrate and ground potential.

26. The apparatus for driving an electro-optic converter assembly as in claim 22 further comprising a well etched between the electro-optic converter and resistor.

27. The apparatus for driving an electro-optic converter assembly as in claim 21 further comprising a conductive trace disposed across a top layer of the resistor interconnecting the top layer and an intrinsic layer of the resistor.

28. The apparatus for driving an electro-optic converter assembly as in claim 21 further comprising a set of respective connections with the electro-optic converter and resistor disposed on a common side of the substrate.

29. The apparatus for driving an electro-optic converter assembly as in claim 28 wherein the coupling between the current loop and the differential amplifier further comprises a first conductor for coupling the electro-optic converter to a positive output of the differential amplifier and a second conductor for coupling the resistor to a negative polarity output of the differential amplifier.

30. The apparatus for driving an electro-optic converter assembly as in claim 21 further comprising a connection between the electro-optic converter and resistor and the differential amplifier.

31. An optical transmitter assembly comprising:

a substrate coupled to a ground potential;

an electro-optic converter disposed on the substrate with a ground connection of the electro-optic converter coupled to the substrate;

a resistor having a resistance value substantially equal to a resistance of the electro-optic converter disposed on the substrate adjacent the electro-optic converter with a ground end of the resistor coupled to the substrate; and a differential amplifier with a first driving output of the differential amplifier operably coupled to an input of the electro-optic converter and a second driving output of the differential amplifier coupled to an input of the resistor.

32. A method of driving an electro-optic converter, such method comprising the steps of:

disposing the electro-optic converter on a grounded substrate;

disposing a resistor having a resistance substantially equal to a resistance of the electro-optic converter on the grounded substrate adjacent the electro-optic converter; and differentially driving the resistor and electro-optic converter in parallel from opposite polarity outputs of a differential amplifier.

33. A method of driving an electro-optic converter through a differential amplifier, such method comprising the steps of:

disposing the electro-optic converter on a grounded substrate;

disposing a resistor having a resistance substantially equal to a resistance of the electro-optic converter on the grounded substrate adjacent the electro-optic converter; and coupling a first polarity output of the differential amplifier to the electro-optic converter and an opposite polarity output of the differential amplifier to the resistor.

34. A method of providing an electro-optic converter assembly for transmitting an information signal, such method comprising the steps of:

disposing the electro-optic converter on a grounded substrate; and disposing a resistor having a resistance substantially equal to a resistance of the electro-optic converter on the grounded substrate adjacent the electro-optic converter, said electro-optic converter being adapted to receive the information signal and said resistor being adapted to receive an opposite polarity of the information signal.

35. A method of driving an electro-optic converter through a differential amplifier, such method comprising the steps of:

disposing a first and second electro-optic converters having substantially equal resistance on a ground plane; and coupling a first polarity output of the differential amplifier to the first electro-optic converter and an opposite polarity output of the differential amplifier to the second electro-optic converter.

* * * * *